United States Patent [19]
Eng et al.

[11] 3,935,096
[45] Jan. 27, 1976

[54] PRODUCTION OF AQUEOUS METAL HYDROXIDE SOLUTIONS OF LOW METAL HALIDE CONCENTRATION

[75] Inventors: Jeffrey D. Eng, North Vancouver; Cyril J. Harke, Burnaby, both of Canada

[73] Assignee: Hooker Chemicals & Plastics Corporation, Niagara Falls, N.Y.

[22] Filed: Jan. 2, 1974

[21] Appl. No.: 430,116

[52] U.S. Cl. ................................................ 210/22
[51] Int. Cl.² .......................................... B01D 13/00
[58] Field of Search .................... 210/22, 23, 321; 260/2.2 R

[56] References Cited
UNITED STATES PATENTS

| | | | |
|---|---|---|---|
| 623,918 | 4/1899 | Lang et al. | 210/22 |
| 3,041,317 | 6/1962 | Gibbs et al. | 260/2.2 R X |
| 3,247,133 | 4/1966 | Chen et al. | 260/2.2 R X |
| 3,257,334 | 6/1966 | Chen et al. | 260/2.2 R X |
| 3,276,996 | 10/1966 | Lazare | 210/22 |
| 3,297,595 | 1/1967 | Mindick et al. | 260/2.2 R X |
| 3,423,491 | 1/1969 | McLain et al. | 210/321 X |

*Primary Examiner*—Frank A. Spear, Jr.
*Attorney, Agent, or Firm*—Peter F. Casella; Herbert W. Mylius

[57] ABSTRACT

A cation-active permselective membrane of a hydrolyzed copolymer of a perfluorinated olefin and a fluorosulfonated perfluorovinyl ether, a modification thereof, or sulfostyrenated perfluorinated ethylene propylene copolymer is employed to dialytically pass metal hydroxide from an aqueous solution thereof containing metal halide halates, thereby purifying the metal hydroxide of the metal halide. The named cation-active permselective membrane materials resist deterioration by the halates, hydroxide and halide components of the solution being purified.

The invention also includes a dialysis cell for effecting the purification.

10 Claims, 1 Drawing Figure

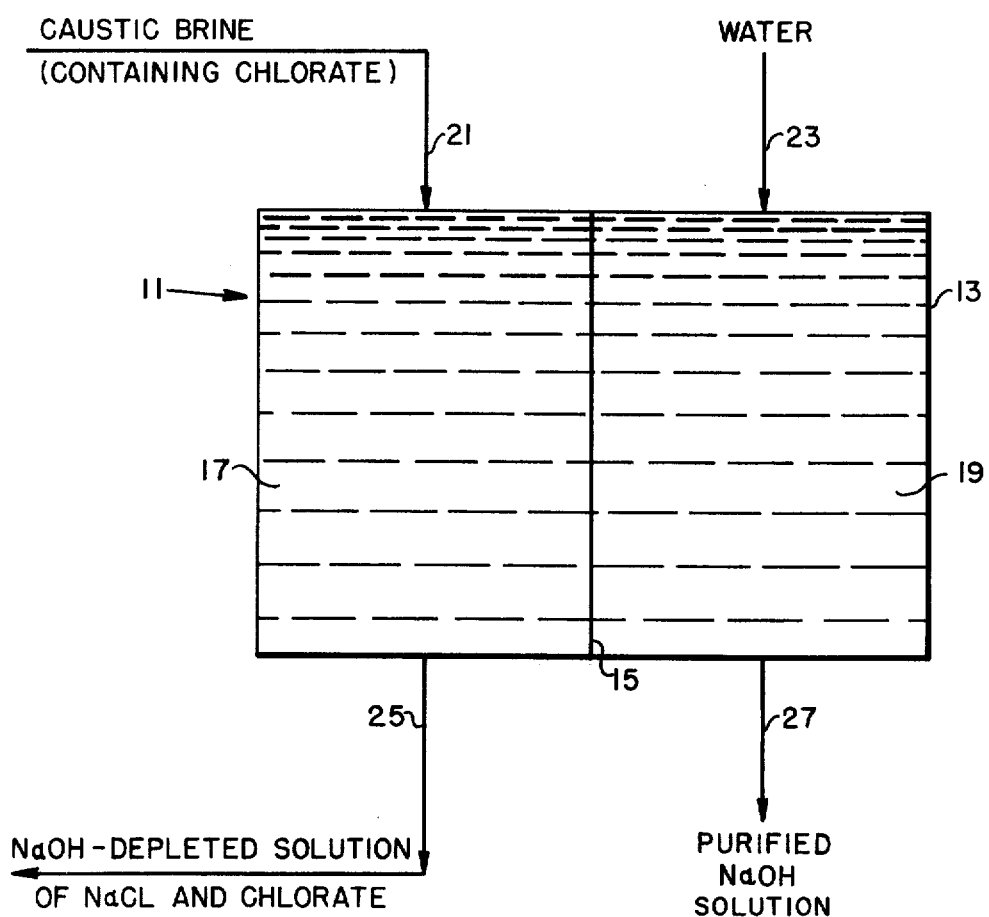

PRODUCTION OF AQUEOUS METAL HYDROXIDE SOLUTIONS OF LOW METAL HALIDE CONCENTRATION

This invention relates to an improved method of purifying aqueous metal hydroxide by ion-exchange dialysis. More particularly, it relates to the production of aqueous metal hydroxide solutions of low metal halide contents. It is especially concerned with production of such metal hydroxide solutions from solutions also containing metal halide and halates, by diffusion of the hydroxide through a cation-active permselective membrane.

An economical, efficient method of separating metal hydroxide from solutions of the hydroxide containing metal halide and halates is required in many areas of the chemical industry which produce such "starting" solutions. Efficient and economical separation of metal hydroxide values is particularly necessary in the manufacture of alkali metal hydroxides, e.g., sodium hydroxide by, electrolysis of aqueous metal halide, e.g., sodium chloride. The catholytes obtained from such electrolysis processes contain not only alkali metal hydroxide and halates but also residual metal halide starting material. Use of conventional separating techniques to separate the hydroxide values from the metal halide values has proven costly and time-consuming and good separations are often not economically obtainable. One simple separatory technique, namely ion-exchange dialysis of the aqueous hydroxide-halide-halate solution with a cation-selective membrane which is permeable to hydroxide anion but not to halide anion has not been employed heretofore as a separatory technique on these solutions since membranes of the type required are usually easily disintegrated even after only short-term contact with the solution. Typical cation-active permselective membranes, such as membranes of heterogeneous polyvinyl chloride base resin of the type available commercially under the trade name Ionac, may be destroyed after about a week's use in contact with such hydroxide-halide-halate solutions.

The aforementioned disadvantages of the prior art are overcome by the present invention, which is directed to a novel method of separating aqueous metal hydroxide values from aqueous metal halide values contained in an aqueous solution of metal hydroxide, metal halide and metal halate. This method comprises diffusing the hydroxide from the solution through a cation-active permselective membrane of a material which is the hydrolyzed copolymer of a perfluorinated olefin and a fluorosulfonated perfluorovinyl ether to produce an aqueous metal hydroxide diffusate solution of low, very low, or trace metal halide concentration, or one which is essentially pure of any halide contamination.

Although they are not as resistant to the medium of the cell as the hydrolyzed copolymers mentioned, also useful in the present purifications are the modified copolymers of perfluorinated olefins and fluorosulfonated perfluorovinyl ethers in which one side of the membrane has $-SO_2NHNa$, $-SO_2NH_2$ or similar moieties and the other has $-SO_2F$, $-SO_2Na$ or $-SO_3H$ moieties. Similarly, the sulfostyrenated perfluoroethylene-propylene resins make effective, resistant membranes.

To effect the described purification there is employed a dialysis cell which comprises a housing with the above-defined membrane positioned within the cell to separate the compartment containing hydroxide-halide-halogen starting solution, (the dialyzate compartment) from the compartment containing hydroxide diffusate (the diffusate compartment).

In preferred embodiments of the invention the permselective membrane is a hydrolyzed copolymer of tetrafluoroethylene and a fluorosulfonated perfluorovinyl ether of the formula $FSO_2CF_2CF_2OCF(CF_3)CF_2OCF=CF_2$ which polymer has an equivalent weight of about 900 to about 1,600, said membrane, if desired, being mounted on a network of supporting material such as polytetrafluoroethylene, perfluorinated ethylene-propylene polymer, polypropylene, asbestos, titanium, tantalum, niobium or noble metal.

The invention will be more readily understood by reference to the following descriptions of embodiments thereof, taken in conjunction with the drawing of means for effecting the invented process and apparatus.

In the Drawing:

The FIGURE is a schematic diagram, in elevation, of a two-compartment dialysis cell for producing aqueous metal hydroxide diffusate solution of low metal halide concentration from a dialyzate or starting solution containing metal hydroxide, metal halide and metal halate. The cell includes a membrane of the described type separating the dialyzate and diffusate compartments. In variations of the cell design plural separated zones are employed, from 3 to 10, with the same or different types of the described cation-active membranes being utilized.

In the FIGURE the points of addition and withdrawal of typical and preferred starting ingredients and products are illustrated. Although the production of sodium hydroxide solutions from sodium hydroxide-sodium chloride-chlorate solutions is illustrated it is to be understood that other halates and water soluble metal hydroxides and halides can be substituted, at least in part, for those illustrated and specifically mentioned herein.

In the FIGURE dialysis cell 11 includes housing 13 and cation-active permselective membrane 15, which divides the interior of the cell into a starting solution or dialyzate compartment 17, and a diffusate compartment 19. An aqueous caustic brine solution containing sodium hydroxide, sodium chloride and sodium chlorate, such as diaphragm cell liquor, is fed to the dialyzate compartment through line 21. Water is fed to the diffusate compartment through line 23. On completion of dialysis, that is diffusion of sodium hydroxide through the membrane to an equilibrium or other desired concentration in the diffusate compartment, the sodium hydroxide-depleted dialyzate solution is withdrawn from the dialyzate compartment through line 25, while the desired purified sodium hydroxide product is withdrawn from the diffusate compartment through line 27.

By the present process metal hydroxide diffuses efficiently through the membrane to provide a diffusate solution which may contain metal hydroxide up to equilibrium concentration with metal hydroxide in the dialyzate compartment, i.e., the purified metal hydroxide solution obtained in the diffusate compartment at equilibrium contains about half of the metal hydroxide charged in the starting solution, if the containers are of equal size. Normally, it can approach the original concentration of the dialyzate. The purified metal hydroxide solution obtained in the diffusate compartment moreover contains only minor amounts of metal halide, usually 0.1 to 10 g./liter of the metal hydroxide diffusate solution. The cell membrane is substantially impermeable to halates so that the diffusate is substantially free of halates dissolved in the starting solution or at least, its concentration is significantly diminished. The operation of the present cell is not impeded or terminated by disintegration of the membrane which remains intact and operative even after long term use in the dialysis process, e.g., use of up to three years or more.

The metal hydroxide, and metal halide of the starting solution are preferably alkali metal hydroxides such as sodium hydroxide and potassium hydroxide, and alkali metal halides, such as sodium and potassium chloride, sodium and potassium bromide or sodium and potassium iodide. Alternatively, other water soluble metal halides and hydroxides, such as those of magnesium or calcium can constitute the starting solution or at least a part thereof. Preferably, the halate dissolved in the starting solution is chlorate, but the dissolved component can alternatively be another halate such as bromate or iodate. Mixtures of different hydroxides, halides and halates can also be used. In a preferred embodiment of the invention, the present process and apparatus are utilized to obtain aqueous sodium hydroxide of low sodium chloride content by dialysis of the catholyte obtained from electrolysis of aqueous brine in diaphragm cells, which, as is well known to those skilled in the art, consists essentially of aqueous sodium hydroxide and sodium chloride, with some chlorate.

The concentrations of metal hydroxide and metal halide in the starting solution are not critical to the operation of the present process. Aqueous starting solutions saturated with respect to the hydroxide and the halide at a given operating temperature can be used, as well as solutions containing as little as 0.1 percent or less of metal hydroxide and as little as 0.1 percent or less of metal halide. Usually, in employing the above-mentioned catholyte as starting solution the concentration of metal hydroxide is about 10 to 15 percent, especially about 11 percent, and the concentration of the metal halide is about 15 to 20 percent, especially about 16 percent, based on the weight of the starting solution. Halate or chlorate content may be from 0.01 to 10 percent but often is from 1 to 10 percent.

The starting solution may even be saturated with respect to the halate constituent but it will be understood that the present dialysis can be effected even with lower concentrations of halate e.g., 1/10 or ½ of the amount dissolved at saturation, or even quantities as small as about 10 p.p.m., based on the starting solution.

The present process and apparatus will generally be operated at a temperature in the range of room temperature to an elevated temperature below the normal boiling point of liquids in the dialyzate and diffusate compartments, that is, at a temperature of about 20° to 95°C. A particular advantage of the present process is the effectiveness of the process at temperatures in the range of about 75°C to 95°C., at which moderately elevated temperatures membranes of conventional dialysis systems may often be rendered inoperative due to heat-accelerated disintegration by the starting solution, especially if it contains dissolved chlorine.

The membranes utilized in the invention to divide the electrolytic cell into compartments and to provide selective ion diffusion are preferably mounted in the cell on networks or screens of supporting material such as polytetrafluoroethylene, perfluorinated ethylene-propylene copolymer, polypropylene, asbestos, titanium, tantalum, niobium or noble metals. Preferably, polytetrafluoroethylene screening is used.

The cation-active permselective membranes used are of known classes of proprietary organic polymers, initially often being thermoplastic, which are substituted with a multiplicity of ionogenic substituents and which, in thin film form, are permeable to negatively charged ions. Certain ions, apparently by means of ion exchange with the ionogenic substituents on the polymer film, are able to pass through the polymer membrane, while other ions, of opposite sign, may be unable to do so.

Cation-active permselective membrane materials which selectively permit passage or diffusion of cations generally contain a multiplicity of sulfonate or sulfonic acid substituents or, in some instances, carboxylate or phosphonate substituents. Cation-active membranes can be prepared by introducing the cation-exchanging substituent, e.g., sulfonate, into a thin film of polymer, e.g., phenol formaldehyde polymer, by chemical reaction, e.g., sulfonation. Other polymers which can be sulfonated in this manner to obtain cation-active membrane materials include polystyrene, styrene-divinyl benzene copolymer, polyvinyl chloride, vinyl chloride-styrene copolymers, polyethylene, and styrenebutadiene rubbers. Alternatively, a homo- or co-polymer containing the cation-exchanging group(s) can be prepared by polymerizing a monomer substituted with the group(s). For example, phenol sulfonic acid can be substituted for some or all of the phenol normally used as a reactant in preparing a phenol formaldehyde polymer to obtain polysulfonated phenol formaldehyde polymer. In another example of this type of procedure, acrylic, methacrylic or maleic acid or its anhydride can be polymerized or copolymerized, e.g., with divinyl benzene, to obtain a cation-active membrane material in which the cation exchanging substituents on the polymer base are carboxylate groups.

The cation-active polymeric membranes used for selective diffusion of ions are further classified as homogeneous, i.e., polymers visually appearing to be of only one phase, or as heterogeneous, i.e., polymers visually appearing to include more than one phase because of the presence of a matrix material in which the ion exchange polymer is embedded in powdered form.

The preparation and structure of cation-active permselective membranes are discussed in greater detail in the chapter entitled "Membranes" in the "*Encyclopedia of Polymer Science and Technology*", published by J. Wiley and Sons, New York, 1968, at Vol. 8, pages 620 to 638, and in the chapter entitled "Synthetic Resin Membranes" in *Diffusion and Membrane Technology*, by S. B. Tuwiner, published by Rheinhold Publishing Corporation, New York, 1962, at pages 200 to 206, the pertinent subjects matter of which references are hereby incorporated by reference.

In addition to the examples of cation-active permselective membranes previously discussed, the following proprietary compositions are representative examples of various cation-active permselective membranes which may be tried in the practice of the present invention: Ionac MC 3142, MC 3235, and MC 3470 XL types - polysulfonate-substituted heterogeneous polyvinyl chloride, manufactured by Ritter-Pfaudler Corp., Permutit Division; Nafion XR type - hydrolyzed copolymer of perfluorinated olefin and a fluorosulfonated perfluorovinyl ether, manufactured by E. I. DuPont de Nemours and Company, Inc.; Nafion XR, modified - Nafion XR treated on one side with ammonia to convert $SO_2F$ groups to $SO_2NH_2$, which are then hydrolyzed to $SO_2NHNa$; RAI Research Corporation membranes such as types 18ST12S and 16ST13S - sulfostyrenated perfluorinated ethylene propylene copolymers.

The most highly preferred cation-active permselective membranes of the invention are the hydrolyzed copolymers of perfluoroolefins and fluorosulfonated perfluorovinyl ethers, the $-SO_2NHNa$ modifications thereof and the sulfostyrenated perfluoroethylene-propylene copolymers, of which the former type is preferred.

The sulfostyrenated perfluoroethylene-propylene polymers, useful as cation-active membranes in a preferred embodiment of the invention, are generally those which have ⅔ to 11/16 of the phenyl groups therein monosulfonated and which are about 16 to 18 percent styrenated. To manufacture the sulfostyrenated perfluoroethylene-propylene copolymer membrane materials, a standard perfluoroethylene-propylene copolymer (hereinafter referred to as FEP), such as is manufactured by E. I. DuPont de Nemours and Company, Inc., is styrenated and the styrenated polymer is then sulfonated. A solution of styrene in methylene chloride or benzene at a suitable concentration in the range of about 10 to 20 percent is prepared and a sheet of FEP polymer having a thickness of about 0.02 to 0.5 mm., preferably 0.05 to 0.15 mm., is dipped into the solution. After removal it is subjected to radiation treatment, using a cobalt $^{60}$ radiation source. The rate of application may be in the range of about 8,000 rads/hr. and a total radiation application is about 0.9 megarad. After rinsing with water the phenyl rings of the styrene portion of the polymer are monosulfonated, preferably in the para position, by treatment with chlorosulfonic acid, fuming sulfuric acid or $SO_3$. Preferably, chlorosulfonic acid in chloroform is utilized and the sulfonation is completed in about ½ hour.

Examples of useful membranes made by the described process are the RAI Research Corporation products previously mentioned, 18ST12S and 16ST13S, the former being 18 percent styrenated and having ⅔ of the phenyl groups monosulfonated and the latter being 16 percent styrenated and having 13/16 of the phenyl groups monosulfonated. To obtain 18 percent styrenation a solution of 17½ percent of styrene in methylene chloride is utilized and to obtain 16 percent styrenation a solution of 16 percent of styrene in methylene chloride is employed.

The especially preferred cation-active permselective membranes of the invention are of a hydrolyzed copolymer of perfluorinated hydrocarbon, e.g., an olefin, and a fluorosulfonated perfluorovinyl ether. The perfluorinated olefin is preferably tetrafluoroethylene, although other perfluorinated hydrocarbons of 2 to 5 carbon atoms may also be utilized, of which the monoolefinic hydrocarbons are preferred, especially those of 2 to 4 carbon atoms and most especially those of 2 to 3 carbon atoms, e.g., tetrafluoroethylene, hexafluoropropylene. The sulfonated perfluorovinyl ether which is most useful is that of the formula

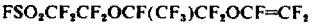

Such a material, named as perfluoro-[2-(2-fluorosulfonylethoxy)-propyl vinyl ether], referred to henceforth as PSEPVE, may be modified to equivalent monomers which are represented by the formula

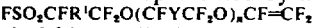

wherein $R^1$ is a radical selected from the group consisting of fluorine and perfluoroalkyl radicals having from 1 to 10 carbon atoms, Y is a radical selected from the group consisting of fluorine and the trifluoromethyl radical, and n is a integer from 1 to 3, inclusive. However, it is most preferred to employ PSEPVE.

The method of manufacture of the hydrolyzed copolymer is described in Example XVII of U.S. Pat. No. 3,282,875 and an alternative method is mentioned in Canadian Pat. No. 849,670, which also discloses the use of the finished membrane in fuel cells, characterized therein as electrochemical cells. The disclosures of such patents are hereby incorporated herein by reference. In short, the copolymer may be made by reacting PSEPVE or equivalent with tetrafluoroethylene or equivalent in desired proportions in water at elevated temperature and pressure for over an hour, after which time the mix is cooled. It separates into a lower perfluoroether layer and an upper layer of aqueous medium with dispersed desired polymer. The molecular weight is indeterminate but the equivalent weight is about 900 to 1,600 preferably 1,100 to 1,400, e.g., 1,250, and the percentage of PSEPVE or corresponding compound is about 10 to 30 percent, preferably 15 to 20 percent and most preferably about 17 percent. The unhydrolyzed copolymer may be compression molded at high temperature and pressure to produce sheets or membranes, which may vary in thickness from 0.02 to 0.5 mm. These are then further treated to hydrolyze pendant $-SO_2F$ groups to $-SO_3H$ groups, as by treating with 10% sulfuric acid or by the methods of the patents previously mentioned. The presence of the $-SO_3H$ groups may be verified by titration, as described in the Canadian patent. Additional details of various processing steps are described in Canadian Pat. No. 752,427 and U.S. Pat. No. 3,041,317, also hereby incorporated by reference.

Because it has been found that some expansion accompanies hydrolysis of the copolymer it is preferred to position the copolymer membrane after hydrolysis onto a frame or other support which will hold it in place in the electrolytic cell. Then it may be clamped or cemented in place and will be true, without sags. The membrane is preferably joined to the backing tetrafluoroethylene or other suitable filaments prior to hydrolysis, when it is still thermoplastic, and the film of copolymer covers each filament, penetrating into the spaces between them and even around behind them, thinning the films slightly in the process, where they cover the filaments.

The aminated and hydrolyzed improvements or modifications of the polytetrafluoroethylene PSEPVE copolymers are made, as previously mentioned, by treatment with ammonia of one side of the copolymer, before hydrolysis thereof, and then hydrolyzing with caustic or other suitable alkali. Acid forms may also be utilized. The final hydrolysis may be conducted after the membrane is mounted on its supporting network or screen. The membranes so made are fluorinated polymers having pendant side chains containing sulfonyl groups which are attached to carbon atoms bearing at least one fluorine atom, with sulfonyl groups on one surface being —(SO$_2$NH)$_n$M form, where M is H, NH$_4$, alkali metal or alkaline earth metal and $n$ is the valence of M, and the sulfonyls of the polymer on the other membrane surface being in —(SO$_3$)$_p$Y form or —SO$_2$F, wherein Y is a cation and p is the valence of the cation, with the requirement that when Y is H, M is also H. In use the sulfonamide side faces the dialyzate compartment.

A complete description of methods for making the above improved membrane is found in French Pat. No. 2,152,194 of E. I. DuPont de Nemours and Company, Inc., corresponding to U.S. Pat. application Ser. No. 178,782, filed Sept. 8, 1971 in the name of Walther Gustav Grot, which disclosures are hereby incorporated herein by reference.

The membranes of hydrolyzed copolymer of perfluorinated olefin and fluorosulfonated perfluorovinyl ether and the one-side hydrolyzed aminated modifications thereof described are far superior in the present processes to various other cation-active membrane materials. The RAI type membranes are also generally superior to those previously known. The preferred membranes last for much longer time periods in the medium of the cell and do not become brittle when subjected to long term contact with halate (chlorate), halide (sodium chloride) and alkali (sodium hydroxide). Considering the savings in time and fabrication costs, the present membranes are more economical. They do not fail when chlorine is present and the caustic concentration in the dialyzate compartment increases to above about 100 g./l. of caustic. The selectivity of the membrane and its compatibility with the medium do not decrease detrimentally as the chlorine and hydroxyl concentrations in the catholyte liquor increase, as has been noted with other cation-active membrane materials. Thus, these differences in the present process make it practicable, whereas previously described processes have not attained commercial acceptability. While the more preferred copolymers are those having equivalent weights of 900 to 1,600, with 1,100 to 1,400 being most preferred, some useful resinous membranes employable in present methods may be of equivalent weights from 500 to 4,000. The medium equivalent weight polymers are preferred because they are of satisfactory strength and stability, enable better selective ion exchange to take place and are of lower internal resistances, all of which are important to the present cell's improved operation.

The improved versions of the TFE - PSEPVE copolymers, made by chemical treatment of surfaces thereof to modify the —SO$_3$H group thereon, may have the modification only on the surface or extending as much as halfway through the membrane. The depth of treatment will usually be from 0.001 to 0.2 mm., e.g., 0.01 mm.

The walls of membranes used in the present process will normally be from 0.02 to 0.5 mm. thick, preferably 0.1 to 0.4 mm. thick. When mounted on a polytetrafluoroethylene, asbestos, titanium or other suitable network, for support, the network filaments or fibers will usually have a thickness of 0.01 to 0.5 mm., preferably 0.05 to 0.15 mm., corresponding to up to the thickness of the membrane. Often it will be preferable for the fibers to be less than half the film thickness but filament thicknesses greater than that of the film may also be successfully employed, e.g., 1.1 to 5 times the film thickness. The networks, screens or cloths have an area percentage of openings therein from about 8 to 80 percent, preferably about 10 to 70 percent and most preferably about 20 to 70 percent. Generally the cross-sections of the filaments will be circular but other shapes, such as ellipses, squares and rectangles, are also useful. The supporting network is preferably a screen or cloth and although it may be cemented to the membrane it is preferred that it be fused to it by high temperature, high pressure compression before hydrolysis of the copolymer. Then, the membrane-network composite can be clamped or otherwise fastened in place in a holder or support.

The material of construction of the cell body is conventional, including steel, concrete, stressed concrete or other suitably strong material, lined with mastics, rubbers, e.g., neoprene, polyvinylidene chloride, FEP, chlorendic acid based polyester, polypropylene, polyvinyl chloride polytetrafluoroethylene or other suitable plastic, usually being in tank or box form. Substantially self-supporting structures, such as rigid polyvinyl chloride, polyvinylidene chloride, polypropylene or phenol formaldehyde resins may be employed, preferably reinforced with molded-in fibers, cloths or webs, such as asbestos fibers.

While the compartments of the present cell will usually be separated from each other by flat membranes and will usually be of substantially rectilinear or parallelepipedal construction, various other shapes, including curves, e.g., cylinders, spheres, ellipsoids; and irregular surfaces, e.g., sawtoothed or plurally pointed walls, may also be utilized. Pluralities of individual cells of the invention can be employed in multicell units, often having common feed and product manifolds and being housed in unitary structures.

For satisfactory and efficient operation of the present cell the volumes of the compartments will be about the same.

The dialysis process of this invention proceeds rapidly, so that normally the metal hydroxide concentration in the diffusate compartment approaches or is in equilibrium with the metal hydroxide concentration in the dialyzate compartment in about ½ to 5 hours. The present dialytical production of aqueous metal hydroxides of low halide contents can be effected batchwise or in continuous fashion, with the latter usually being much preferred. In both cases forced circulation is preferably used.

The metal hydroxide solution obtained in the diffusate compartment of the present dialysis cell can, if desired, be evaporated to a hydroxide solution of greater concentration or, alternatively, is diluted with water to provide a metal hydroxide solution of lower concentration. The product solution, can be employed as alkali treatment agent in a variety of industrial applications requiring aqueous metal hydroxide solutions of low metal halide content, for example, as alkaline treatment agents in pulping woodchips in pulp mills, generating hypohalites, e.g., hypochlorites, manufacturing halates, e.g., chlorates, neutralizing acids, peroxide bleaching, making caustic sulfites, or regenerating ion exchange resins.

The aqueous solution of metal halide removed from the dialyzate compartment on completion of dialysis, which is depleted in metal hydroxide, i.e., contains about 50 percent of the metal hydroxide originally charged in the starting solution, is conveniently fed to a flash evaporator or other concentration stage, wherein a portion of the dissolved metal halide is crystallized and recovered as a solid, as part of the water is evaporated. The evaporated solution, which contains metal halide and hydroxide values, is advantageously recycled to the feed stream, i.e., the starting solution charged to the dialyzate compartment.

The dialysis process of the invention is characterized by efficient long term operations, that is, the particular preferred membranes of the present dialysis process and cell last much longer than other known cation-active permselective membranes, including also, other fluorinated membranes. The present membrane does not disintegrate, become brittle, or decrease in selectivity with respect to the ions diffusing through it, even at operating temperatures of 75°C. or higher, despite long term contact with wet elemental halogens, dissolved halogens, halates and halides and metal hydroxides. In the production of aqueous metal hydroxides of low halide contents, according to the described process, the membranes generally remain intact and maintain their efficiencies for up to three years and more, without need of replacement. Even when such longevity is not obtained they are still significantly longer lived than other anionic and cationic membranes in the described environment. As a result of such stability the membranes are commercially feasible for use in dialyzing diaphragm cell liquor to bring it up to mercury cell or membrane electrolyte cell purities (low chloride content), permitting uses of already installed diaphragm cells, without modifications, to make such caustic.

The following examples illustrate but do not limit the invention. Unless otherwise indicated, all parts are by weight and temperatures are in °C.

EXAMPLE 1

A two-compartment dialysis cell, as illustrated in the FIGURE, is utilized to prepare aqueous sodium hydroxide of low sodium chloride concentration from the catholyte solution obtained in the diaphragm cell electrolysis of aqueous sodium chloride, using a Hooker C-60 electrolysis cell. The dialysis cell is rectilinear in shape and is constructed of steel with an overall interior capacity of two thousand liters being divided into two compartments of equal volumes by a flat cation-active permselective membrane sold as XR-type membrane under the trademark Nafion by E I DuPont de Nemours and Company, Inc. The membrane is 7 mils thick (about 0.2 mm.) and is joined to a backing or supporting network of polytetrafluoroethylene (Teflon) filaments of a diameter of about 0.1 mm., woven into a cloth which has an area percentage of openings therein of about 22 percent. The membrane is fused onto the backing by high temperature, high compression pressing with some of the membrane portions flowing around the filaments of the backing during the fusion process so as to lock the membrane onto the backing cloth, without thickening the membrane between the cloth filaments.

The material of the XR-type permselective membrane is hydrolyzed copolymer of the perfluorinated olefin, tetrafluoroethylene, and the fluorosulfonated perfluorovinyl ether, PSEPVE, having an equivalent weight of about 1,250.

The dialyzate compartment of the cell is filled with an aqueous solution, at 95°C., which is obtained directly from the cathode compartment of the Hooker brine electrolysis cell, as previously mentioned. The liquid contains about 11 percent sodium hydroxide, 16 percent sodium chloride, and about 1 percent sodium chlorate. The diffusate compartment of the cell is filled with water at 95°C. The cell is maintained at 95°C for 5 hours, after which the contents of both compartments are removed, cooled and analyzed. The dialyzate and diffusate compartments are then refilled with fresh catholyte starting solution and water, respectively and the process is repeated over and over for as long as a year and more. The aqueous solutions removed from the diffusate compartment over that period contain, on the average, about 5.5 percent of sodium hydroxide, only about 0.1 to 10 g./l. of sodium chloride and are substantially free of chlorate. The aqueous solutions recovered from the dialyzate compartment contain about 5.5 percent sodium hydroxide, in addition to dissolved chlorate and sodium chloride. Substantially similar results are obtained in the foregoing dialysis when the membrane is replaced by similar membranes having thicknesses of 4, 10 and 14 mils.

The foregoing procedure is also modified to operate the dialysis on a continuous basis, with provision for the passage of the sodium hydroxide-depleted sodium chloride dialyzate solution to a flash evaporator for partial evaporation of water and for crystallyzation of a portion of the sodium chloride, which can be continuously removed from the evaporator by filtration or decantation. The partially evaporated solution is combined with the feed stream of catholyte entering the dialyzate compartment and the process is operated so as to produce only the improved caustic (sometimes at concentrations approaching those charged) plus the removed chloride and chlorate, which is also removed in the evaporator. In the continuous process it will often be possible for less water to be charged and sometimes virtually none is added after startup. If desired, the cells are operated at other temperatures, e.g., 20°, 50° and 75°, with results substantially equivalent to those obtained above. Similar results are obtained when the dialyzate compartment is held under a pressure of about 10 lbs./sq. in. g.

EXAMPLE 2

The dialysis procedure of Example 1 is repeated substantially as described except that the fluorinated membrane of Example 1 is replaced with a cation-active selective membrane of 14 mils thickness which is composed of a heterogeneous polyvinyl chloride base and is marketed as Type MC 3470 under the tradename Ionac by Permutit Division of the Ritter-Pfaudler Corporation. After dialysis for only one week this membrane disintegrates, terminating the experiment.

The foregoing result, compared with the long term repeated dialyses of Example 1, clearly indicates the superior performance of the membrane of the present process in the dialytic production of metal hydroxide solutions of low metal halide concentration when chlorate or other halate is present. Both experimental and comparative runs are more effective when agitation is employed in the feed compartment.

EXAMPLE 3

The dialysis procedure of Example 1 is repeated in two experiments, utilizing ten mil cation-active selective membranes of fluorinated membrane materials identified as 18ST12S ST12S and 16 ST13S, respectively, made by RAI Research Corporation, in replacement of the hydrolyzed copolymer of tetrafluoroethylene and fluorosulfonated perfluorovinyl ether. The former of the RAI products is a sulfostyrenated perfluorinated ethylenepropylene polymer in which the polymer is 18 percent styrenated and has ⅔ of the phenyl groups thereof monosulfonated. The latter RAI product is a sulfostyrenated perfluorinated ethylenepropylene polymer in which the polymer is 16 percent styrenated and has 13/16 of the phenyl groups thereof monosulfonated. Repeated dialysis with these membranes, following the procedure of Example 1, is continued for about 10 weeks with substantially the same results obtained in Example 1, after which period the membranes begin to show signs of wear, causing termination of dialysis. The foregoing result, compared with the long term repetition of dialysis in Example 1, indicates the significant superiority of the Nafion XR membranes in the medium employed.

EXAMPLE 4

The procedures of Examples 1–3 are repeated, employing in both the batch and continuous processes the modified Nafion type membranes previously described and mentioned in French Pat. No. 2,152,194, wherein the material of construction is aminated and hydrolyzed on only one side. Thus, the membranes on one side have the sulfonyl groups in the $-SO_2NHNa$ or $SO_2NH_2$ form whereas those on the other side are in $-SO_2F$ or $-SO_3H$ form. Although such modified membranes are generally superior in electrolytic-dialytic processes compared to the Nafion XR membranes, especially with respect to current efficiencies, they do not last as long when employed as dialysis membranes in the present operations, although they are more satisfactory than RAI, Ionac, and AMFion cation-active permselective membranes described.

In all the above experiments the diffusate is subsequently used in pulp mill operations when the diaphragm cells and the electrodialytic apparatuses are "on site." The sodium hydroxide solution is satisfactory for such use and of course, the chlorine obtained from the diaphragm cell and from the stripping of chlorine from the cell liquor is similarly useful. This improvement in diaphragm cell operation makes such cells more competitive with mercury cells, which are environmentally hazardous, although they have been favored in the past for producing purer caustic solutions.

The invention has been described with respect to working examples and illustrative embodiments but it is not to be limited to these because it is evident that one of ordinary skill in the art will be able to utilize substitutes and equivalents without departing from the spirit of the invention or going beyond the scope of the claims.

What is claimed is:

1. A method of separating metal hydroxide from metal halide in an aqueous solution of metal hydroxide, metal halide and halate which comprises diffusing the metal hydroxide from the solution through a cation-active permselective membrane of a material selected from the group consisting of the hydrolyzed copolymer of a perfluorinated olefin and a fluorosulfonated perfluorovinyl ether, one-side modified, derivatives thereof and sulfostyrenated perfluoroethylene-propylene to produce an aqueous metal hydroxide diffusate solution of low metal halide concentration.

2. A method according to claim 1 wherein the membrane material is a hydrolyzed copolymer of a tetrafluoroethylene and
$FSO_2CF_2CF_2OCF(CF_3)CF_2OCF=CF_2$ 3. A method according to claim 2 wherein the equivalent weight of the hydrolyzed copolymer is in the range of about 900 to about 1,600.

4. A method according to claim 3 wherein the equivalent weight of the hydrolyzed copolymer is in the range of about 1,100 to about 1,400 and the thickness of the permselective membrane is from about 0.02 to about 0.5 mm.

5. A method according to claim 4 wherein the metal hydroxide is an alkali metal hydroxide, the metal halide salt is an alkali metal halide and the thickness of the membrane is from about 0.1 mm. to about 0.5 mm.

6. A method according to claim 5 wherein the alkali metal halide is alkali metal chloride, the halate is a chlorate and the thickness of the membrane is about 0.1 mm. to about 0.3 mm.

7. A method according to claim 6 wherein the starting solution is saturated with chlorate.

8. A method as claimed in claim 7 wherein the alkali metal chloride is sodium chloride and the alkali metal hydroxide is sodium hydroxide.

9. A method according to claim 8 wherein the initial concentrations of sodium chloride and sodium hydroxide in the starting solution are, respectively, about 15 to 20 percent and about 10 to 15 percent.

10. A method according to claim 9 wherein the starting solution contains about 11 percent sodium hydroxide and about 16 percent of sodium chloride.

* * * * *